W. V. TURNER.
COMBINED AUTOMATIC AND STRAIGHT AIR BRAKE.
APPLICATION FILED APR. 6, 1908.
971,807.
Patented Oct. 4, 1910.
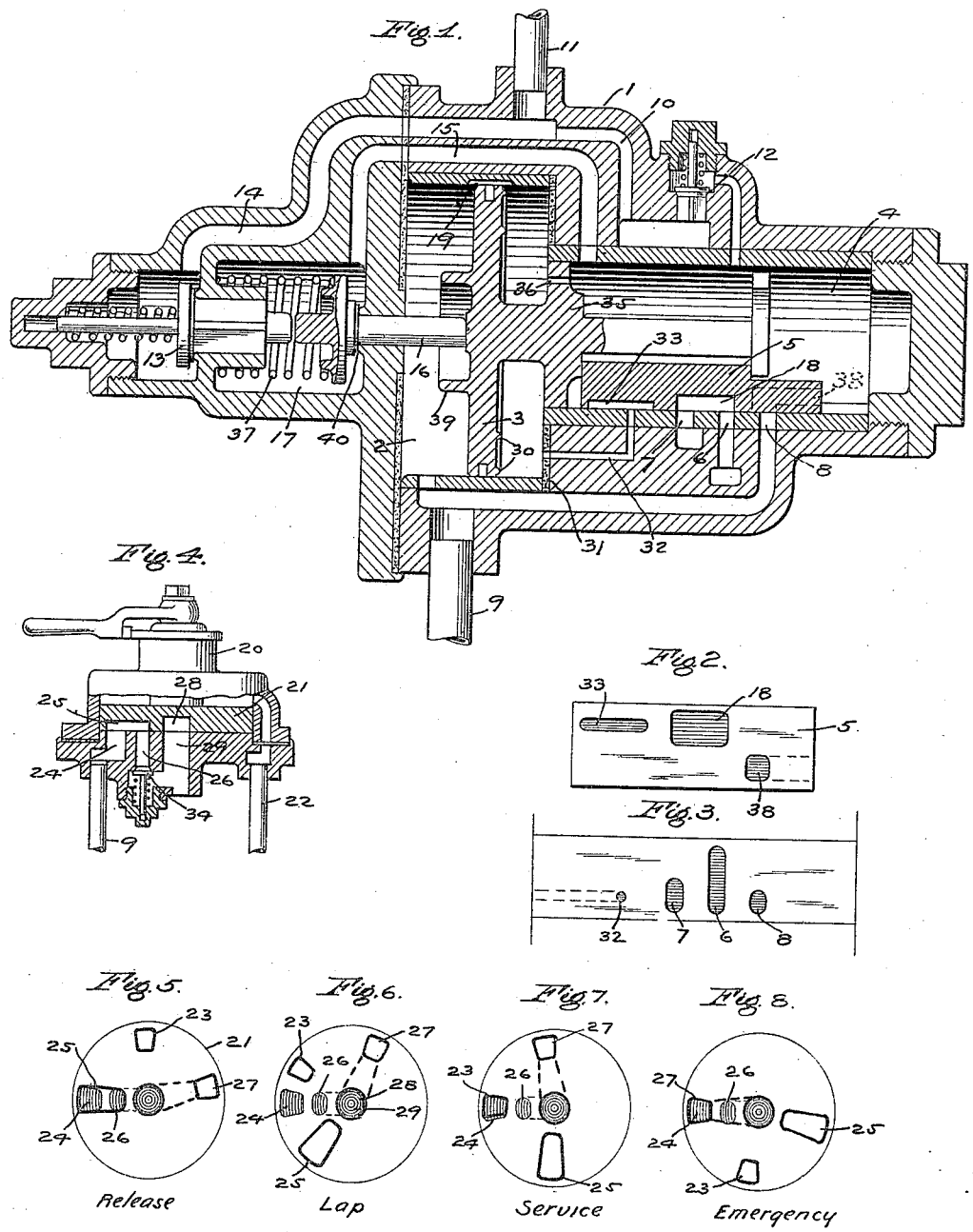
WITNESSES
INVENTOR
Walter V. Turner
by
Att'y.

UNITED STATES PATENT OFFICE.

WALTER V. TURNER, OF EDGEWOOD, PENNSYLVANIA, ASSIGNOR TO THE WESTING-HOUSE AIR BRAKE COMPANY, OF PITTSBURG, PENNSYLVANIA, A CORPORATION OF PENNSYLVANIA.

COMBINED AUTOMATIC AND STRAIGHT-AIR BRAKE.

971,807. Specification of Letters Patent. Patented Oct. 4, 1910.

Application filed April 6, 1908. Serial No. 425,492.

*To all whom it may concern:*

Be it known that I, WALTER V. TURNER, a citizen of the United States, residing at Edgewood, in the county of Allegheny and State of Pennsylvania, have invented new and useful Improvements in Combined Automatic and Straight-Air Brakes, of which the following is a specification.

This invention relates to fluid pressure brakes, and more particularly to a combined automatic and independent brake apparatus in which a single brake pipe is employed for controlling both the automatic and independent applications of the brakes.

The principal object of my invention is to provide an improved apparatus of the above character of few parts and having considerable flexibility in the matter of grading the brake cylinder pressure up or down.

In the accompanying drawing; Figure 1 is a central sectional view of the controlling valve mechanism; Fig. 2 a face view of the slide valve therefor, showing the location of cavities and ports; Fig. 3 a plan view of the valve seat for the above valve, showing the arrangement of the ports therein; Fig. 4 a view in part section of the brake valve employed; and Figs. 5 to 8 inclusive, diagrams illustrating the brake valve in the respective positions of release, lap, service and emergency.

According to the preferred construction, illustrated in Fig. 1 of the drawing, the controlling valve mechanism comprises a casing 1 having a piston chamber 2 containing piston 3, and a valve chamber 4, containing a slide valve 5.

The single combined automatic and independent brake pipe 9 is connected to the piston chamber 2 at the outer face of the piston 3 and also leads to a port 8 in the valve seat of the slide valve 5. The valve chamber 4 is connected to a source of fluid pressure by way of a pipe 11 and a passage 10 in the valve casing. The source of pressure may be the main reservoir on motor cars or an auxiliary reservoir on trailer cars, and the passage 10 is provided with a reducing valve 12 to limit the degree of pressure of the fluid which flows through the valve from the source of pressure, to a predetermined degree according to the standard pressure carried in the brake system.

In its normal release position, the piston 3 occupies an intermediate position, as shown in Fig. 1, and outward movement therefrom is resisted by a spring stop device 16. In this position a by pass 19 is open around the piston to permit the flow of air from one side of the piston to the opposite side.

The preferred form of brake valve which I employ is illustrated in Fig. 4 and comprises a casing 20 containing a rotary valve 21. The usual main reservoir pipe 22 opens into the chamber above the rotary valve 21 and the rotary valve is provided with a through port 23 for supplying air from said chamber to a port 24 which leads to the brake pipe 9. The rotary valve is also provided with a cavity 25 for connecting the brake pipe port 24 with an exhaust port 26 in the release position, and a port opening 27, connected by a passage in the rotary valve with a central opening 28, which constantly registers with a central exhaust port 29.

In operation the parts are charged to a certain standard pressure as desired, say 70 lbs. from the main reservoir on the motor cars, through the pipe 11 and passage 10, valve chamber 4, and through the feed groove 19 around the piston 3 to the chamber 2 and the brake pipe, the brake valve being in lap position as shown in Fig. 6 during normal running. It will thus be seen that the system is charged through the controlling valve mechanism from the source of pressure instead of the ordinary manner through the brake valve.

On trailer cars, or cars not equipped with a source of fluid pressure supply, the auxiliary reservoir may be charged from the brake pipe in the usual manner, but I prefer to utilize an emergency valve 13, which controls communication from the passage 14, leading to pipe 11 and the reservoir, and a chamber 17, which is connected by a passage 15 to the valve chamber 4. The emergency valve being subject only to the pressure of a light spring, sufficient to normally hold the valve seated, it will be seen that upon fluid under pressure being supplied to the brake pipe from the motor car, air flows from the piston chamber 2 through the feed groove 19 around the piston 3 to the valve chamber 4, and thence through passage 15 to chamber 17. The emergency valve 13 is lifted from its seat by the pressure in chamber 17, and air then flows through passage 14 and pipe 11 to the auxiliary reservoir, charging the same to the normal standard pressure.

The parts being charged up to the standard pressure, if it is desired to make an independent or straight air application of the brakes, the brake valve is turned to service position, shown in Fig. 7, in which the through port 23 registers with brake pipe port 24. The brake pipe pressure is thereupon increased above the standard normal pressure a certain amount, say about five pounds, sufficient to shift the piston 3 to its inner position, the brake valve is then turned back to the lap position, Fig. 6. The piston 3 is provided with seat rings or ribs 30 adapted to make a tight joint in the inner position on a seating gasket 31. The space intermediate said rings is in open communication with a port 32 leading to the slide valve seat, and the slide valve 5 is provided with a cavity 33 adapted in the inner position to connect the port 32 with exhaust port 7. Thus the inner area of the piston 3, subject to the reservoir pressure in valve chamber 4, is considerably reduced and consequently a low pressure on the brake pipe side of the piston is sufficient to maintain said piston seated. Cavity 18 in slide valve 5 also connects the brake cylinder port 6 with the brake pipe port 8, so that the fluid under pressure in the brake pipe equalizes into the brake cylinder. The pressure thus resulting in the brake cylinder will of course depend on the proportionate size of the brake cylinder, but I prefer to employ a brake cylinder having such relation to the volume of the brake pipe that the equalized pressure will be about 10 pounds. The relative areas of the piston 3, subject respectively to the brake pipe pressure on one side and reservoir pressure on the opposite, are such that said piston is maintained seated even after the brake pipe pressure equalizes fully into the brake cylinder. The brake cylinder pressure may now be readily increased as desired by again moving the brake valve handle to the service position to admit fluid under pressure to the brake pipe and thence through the cavity 18 to the brake cylinder. In like manner, the brake cylinder pressure may be graded down by turning the brake valve from lap position to release position, shown in Fig. 5, in which the brake pipe port 24 is connected by cavity 25 in the rotary valve with the exhaust port 26. Upon the desired reduction in pressure the brake valve is returned to lap position. If it is desired to entirely release the brakes, the brake valve is held in the release position.

I do not propose to permit the complete exhaustion of air from the brake cylinder and the brake pipe in the release position, for the reason that the emergency application is effected by such reduction in the brake pipe pressure, as will appear hereinafter, so that I interpose in the exhaust port 26 an excess pressure valve 34, which is adjusted to retain a pressure of about five pounds in the train pipe. As air is exhausted from the brake cylinder and the brake pipe a point is reached, somewhat less than the equalizing pressure of the brake pipe and the brake cylinder, at which the reservoir pressure acting on the reduced area of the inner side of piston 3 is sufficient to overcome the low brake pipe pressure on the outer face of the piston, so that said piston is thereupon shifted outwardly. Upon leaving the gasket seat, the full area of the piston is exposed to reservoir pressure and consequently the movement of the piston is accelerated. On the piston attaining the intermediate position of release, the feed groove 19 is opened so that the fluid pressures on the opposite sides of the piston are permitted to equalize and at the same time the piston engages the spring stop 16. The resistance of the spring stop and the rapid equalization of the opposing fluid pressures on the piston cause the same to stop in its release position. The fluid under pressure which still remains in the brake cylinder is then released through the exhaust cavity 18 in the slide valve 5 and exhaust port 7.

In order to steady and prevent too rapid movement of the piston 3 in shifting outwardly from the inner seat, I may also provide a piston head 35, connected to the piston 3 and closely fitting the bore of the valve chamber 4, said piston being provided with a small port 36 to permit a gradual flow of air therethrough. Thus, as the piston 3 leaves its seat the pressure on the larger area thereof, which is now exposed, gradually rises to the reservoir pressure and so the tendency of the piston to move out rapidly is lessened.

An automatic emergency application of the brakes occurs upon a complete emptying of the brake pipe, either by a break-in-two of the train or bursting of a flexible hose, or by turning the brake valve to the emergency position, as illustrated in Fig. 8, in which the large exhaust opening 27 is in full register with the brake pipe port 24. The fluid under pressure in the brake pipe is thus vented to the atmosphere and the reservoir pressure acting on the inner face of piston 3 is then sufficient to overcome the tension of the spring 37 which acts on the spring stop 16, and the piston is shifted to its outer seat. The spring stop 16 is so arranged that in its outward movement the emergency valve 13 is engaged and thereby lifted from its seat, thus permitting fluid at the full main reservoir pressure, or the auxiliary reservoir pressure on the trailer car, to flow through passage 14 past the valve 13 to chamber 17 and passage 15 and thence to the valve chamber 4. In the outer emergency position of the piston, the slide valve 5 establishes communication through a port 38 therein from the brake cylinder port 6 to the valve chamber 4, so that the high reservoir pressure therein is admitted to the brake cylinder, causing an emergency application of the brakes. In order to prevent possible leakage of air around the stem of the spring stop 16 from chamber 17 to the brake pipe, a seating ring 39 is provided on the piston 3, which is adapted to form a tight joint on the usual emergency gasket. After an emergency application the brakes are released by increasing the brake pipe pressure, and this may be done by turning the brake valve to the service position, Fig. 7, as will be apparent. Upon a sufficient increase in brake pipe pressure, with the assistance of the spring 37, the piston 3 is returned to release position. In order to prevent leakage of air from the chamber 17 around the stem of the spring stop to the piston chamber 2, which might occur when the brake pipe pressure is less than normal in making service applications of the brake, I preferably provide a suitable seat 40 adjacent the stem and within the chamber 17.

My invention has especial utility in connection with electric traction service, on account of its simplicity and by reason of the fact that the advantages of the automatic brake and the flexibility and ease of manipulation of the straight air brake are secured with but one train brake pipe.

Having now described my invention, what I claim as new and desire to secure by Letters Patent, is:

1. In a fluid pressure brake, the combination with a brake pipe and brake cylinder, of a valve mechanism operating upon a reduction in brake pipe pressure to supply air to the brake cylinder, and adapted upon increase in train pipe pressure to move to a position for opening communication from the brake pipe to the brake cylinder, and means for holding the valve mechanism in said open position.

2. In a fluid pressure brake, the combination with a brake pipe and brake cylinder, of a valve mechanism operating upon a reduction in brake pipe pressure to supply air to the brake cylinder, and operating upon an increase in brake pipe pressure to establish a free open communication from the brake pipe to the brake cylinder, and means for maintaining the valve mechanism in the position for opening said communication to thereby permit the brake pipe pressure to equalize into the brake cylinder.

3. In a fluid pressure brake, the combination with a brake pipe, brake cylinder, and brake valve for controlling the brake pipe pressure, of a valve mechanism operating upon a reduction in brake pipe pressure to supply air to the brake cylinder, and upon an increase in brake pipe pressure to open communication from the brake pipe to the brake cylinder, and means for maintaining the valve mechanism in the position for opening said communication, to thereby permit the brake cylinder pressure to be increased or diminshed by manipulation of the brake valve.

4. In a fluid pressure brake, the combination with a brake pipe, brake cylinder, and brake valve for controlling the pressure in the train pipe, of a valve mechanism operating upon a reduction in brake pipe pressure to supply air to the brake cylinder, and upon an increase in brake pipe pressure to establish a free open communication from the brake pipe to the brake cylinder, and means for holding said valve mechanism in the position for establishing said free open communication, to thereby permit equalization of the brake pipe pressure into the brake cylinder and the increase or reduction of brake cylinder pressure through the brake pipe by manipulation of the brake valve.

5. In a fluid pressure brake, the combination with a brake pipe and brake cylinder, of a valve and piston subject to the opposing pressures of the brake pipe and a chamber and adapted upon a reduction in brake pipe pressure to supply air to the brake cylinder, and upon an increase in brake pipe pressure to open communication from the brake pipe to the brake cylinder, and means for reducing the effective area of said piston subject to the pressure in the chamber, in the position for opening communication from the brake pipe to the brake cylinder, to maintain the valve and piston in said open position.

6. In a fluid pressure brake, the combination with a train brake pipe, of a valve device adapted to be shifted upon an increase in said brake pipe pressure to a position for supplying air from the brake pipe to the brake cylinder and means for maintaining the valve device in said position.

7. In a fluid pressure brake, the combination with a train pipe and brake cylinder, of an automatic valve device operating upon a reduction in train pipe pressure for supplying air to the brake cylinder and upon an increase in train pipe pressure for supplying air from the train pipe to the brake cylinder and means for holding said valve device in the position for supplying air from the train pipe to the brake cylinder.

8. In a fluid pressure brake, the combination with a train brake pipe, of a valve device operating upon an increase in pressure in the train brake pipe for supplying fluid from said train brake pipe to the brake cylinder, a brake valve for controlling the admission of fluid under pressure to said train brake pipe and means for permitting equalization from the brake pipe into the brake cylinder.

In testimony whereof I have hereunto set my hand.

WALTER V. TURNER.

Witnesses:
R. F. EMERY,
WM. M. CODY.